(12) United States Patent
Daughtrey

(10) Patent No.: US 8,266,547 B2
(45) Date of Patent: *Sep. 11, 2012

(54) GRAPHICAL USER INTERFACE FOR TRAVEL PLANNING SYSTEM

(75) Inventor: Rodney S. Daughtrey, Cambridge, MA (US)

(73) Assignee: Google Inc., Mountain View, CA (US)

( * ) Notice: Subject to any disclaimer, the term of this patent is extended or adjusted under 35 U.S.C. 154(b) by 559 days.

This patent is subject to a terminal disclaimer.

(21) Appl. No.: 12/185,154

(22) Filed: Aug. 4, 2008

(65) Prior Publication Data

US 2008/0288884 A1  Nov. 20, 2008

Related U.S. Application Data

(63) Continuation of application No. 10/697,823, filed on Oct. 30, 2003, now Pat. No. 7,409,643, which is a continuation of application No. 09/431,679, filed on Nov. 1, 1999, now Pat. No. 6,801,226.

(51) Int. Cl.
*G06F 3/00* (2006.01)
(52) U.S. Cl. ........ 715/825; 715/750; 715/748; 715/733; 715/760; 715/772
(58) Field of Classification Search .................. 715/750, 715/748, 733, 760, 763, 765, 772, 764, 825; 705/5
See application file for complete search history.

(56) References Cited

U.S. PATENT DOCUMENTS

| | | |
|---|---|---|
| 4,862,357 A | 8/1989 | Ahlstrom et al. |
| 5,021,953 A | 6/1991 | Webber et al. |
| 5,177,684 A | 1/1993 | Harker et al. |
| 5,191,523 A | 3/1993 | Whitesage |
| 5,237,499 A | 8/1993 | Garback |
| 5,253,166 A | 10/1993 | Dettelbach et al. |
| 5,255,184 A | 10/1993 | Hornick et al. |
| 5,331,546 A | 7/1994 | Webber et al. |
| 5,422,809 A | 6/1995 | Griffin et al. |
| 5,559,707 A | 9/1996 | DeLorme et al. |
| 5,644,721 A | 7/1997 | Chung et al. |
| 5,685,001 A * | 11/1997 | Capson et al. ............... 715/212 |
| 5,784,583 A | 7/1998 | Redpath |
| 5,786,816 A | 7/1998 | Macrae et al. |

(Continued)

FOREIGN PATENT DOCUMENTS

EP  0 451 371 A1  10/1991

(Continued)

OTHER PUBLICATIONS

"Towards desktop personal travel agents", D.T. Ndumu, J.C. Collis and H.S. Nwana, *BT Technol. Journal.*, vol. 16, No. 3, Jul. 1998, pp. 69-78.

(Continued)

*Primary Examiner* — William Bashore
*Assistant Examiner* — Mylinh Tran
(74) *Attorney, Agent, or Firm* — Fish & Richardson P.C.

(57) ABSTRACT

A graphical user interface for a travel planning system is described. The graphical user interface is implemented as a web page and includes a tabular region of the graphical user interface that displays summarized travel options and comprises a plurality of cells that act as controls. The interface also includes a second region that displays selected travel options resulting from filtering a set of travel options in accordance with a control actuated in the tabular region.

53 Claims, 7 Drawing Sheets

U.S. PATENT DOCUMENTS

| | | | |
|---|---|---|---|
| 5,794,172 | A | 8/1998 | Matheson et al. |
| 5,797,127 | A | 8/1998 | Walker et al. |
| 5,826,237 | A | 10/1998 | Macrae et al. |
| 5,832,454 | A | 11/1998 | Jafri et al. |
| 5,838,973 | A | 11/1998 | Carpenter-Smith et al. |
| 5,850,221 | A | 12/1998 | Macrae et al. |
| 5,897,620 | A | 4/1999 | Walker et al. |
| 5,948,040 | A | 9/1999 | DeLorme et al. |
| 6,112,214 | A * | 8/2000 | Graham et al. ............... 715/212 |
| 6,209,026 | B1 | 3/2001 | Ran et al. |
| 6,263,315 | B1 | 7/2001 | Talluri |
| 6,275,808 | B1 * | 8/2001 | DeMarcken ................ 705/6 |
| 6,304,850 | B1 | 10/2001 | Keller et al. |
| 6,307,572 | B1 | 10/2001 | DeMarcken et al. |
| 6,360,205 | B1 * | 3/2002 | Iyengar et al. .................. 705/5 |
| 6,442,526 | B1 | 8/2002 | Vance et al. |
| 2009/0300140 | A1 * | 12/2009 | Himmelstein ................ 709/217 |

FOREIGN PATENT DOCUMENTS

| | | |
|---|---|---|
| EP | 0 762 306 A2 | 12/1997 |
| WO | WO 89/07798 | 8/1989 |
| WO | WO 97/08639 | 3/1997 |

OTHER PUBLICATIONS

Harniman, Brian, Online Travel Sites: Where Do You Really Want to Go Today?, My Mac Magazine Online, Issue #24, Apr. 1997.

Internet Archive Wayback Machine: Jan. 30, 1997, http: www.expedia.com.

* cited by examiner

Boston, MA (BOS) to Los Angeles, CA(LAX) — 7 hrs 25 min

Frontier Airlines Flight F9 563 on a Boeing B-737 (jet) — 80
Departs Boston, MA (BOS) Thur, Oct 28 — 5:40p  4 hrs 35 min
Arrives Denver, CO (DEN) — 8:15p
Layover in Denver — 30 min Frontier Airlines Flight F9 419 on a Boeing B-737 (jet)
Departs Denver, CO (DEN) Thur, Oct 28 — 8:45p  2 hrs 20 min
Arrives Los Angeles, CA (LAX) — 10:05p

Los Angeles, CA (LAX) to Boston, MA (BOS) — 7 hrs 18 min

Northwest Airlines Flight NW300 on a Boeing B-757 (jet)
Departs Los Angeles, CA (LAX) Thur, Nov 4 — 12:45a  3 hrs 28 min
Arrives Minneapolis/St. Paul, MN (MSP) — 80 — 6:13a
Layover in Minneapolis/St. Paul — 1 hr 2 min Northwest Airlines Flight NW714 on a Boeing B-757 (jet)
Departs Minneapolis/St. Paul, MN (MSP) Thur, Nov 4 — 7:15a  2 hrs 48 min
Arrives Boston, MA (BOS) — 11:03a Note: The flight from Los Angeles (LAX) to Minneapolis/St. Paul (MSP) is overnight.

— 80

Show booking details

We are unable to confirm the availability of this option.

This ticket is non-refundable.

Changes to this ticket will incur a penalty fee.

— 82

— Press the back button on your browser to go back —

FIG. 6

GRAPHICAL USER INTERFACE FOR TRAVEL PLANNING SYSTEM

This application is a continuation (and claims the benefit of priority under 35 USC 120) of U.S. application Ser. No. 10/697,823, filed Oct. 30, 2003, (now U.S. Pat. No. 7,409,643), which is a continuation of U.S. application Ser. No. 09/431,679, filed Nov. 1, 1999 (now U.S. Pat. No. 6,801,226).

BACKGROUND

This invention relates generally to computerized travel planning systems.

Travel planning systems are used to produce itineraries and prices by selecting suitable travel units from databases concerning geographic scheduling and pricing information. In particular, travel planning systems that operate over the Internet are known. Some computer travel planning systems, such as Internet sites, generally produce a set of planning options, or itineraries for the traveller to consider. These options are often in the form of a single list of the possible itineraries from which the traveller may select. Such a display approach makes it difficult to clearly compare, discriminate, focus, and assimilate criteria and information that are likely to be important to the traveller.

SUMMARY

According to an aspect of the invention, a graphical user interface for a travel planning system includes a tabular region of the graphical user interface that displays summarized travel options and comprises a plurality of cells that act as controls and a second region that displays selected travel options resulting from filtering a set of travel options in accordance with a control actuated in the tabular region.

According to a further aspect of the invention, a method for displaying travel options includes compartmentalizing travel options into bins according to a set of criteria. The invention has compartmentalizing travel options into 'bins', according to a set of criteria through displaying the resulting bins in a table.

One or more of the following advantages may be provided by one or more aspect of the present invention.

With a summary table as part of a user interface to the travel planning system, travellers can select individual bins inorder to focus on a subset of travel options that they are interested in. Selecting an individual cell displays a secondary level of information about the travel options that are represented in that cell. In this secondary level of information about individual travel options, each travel option has a mechanism for selecting and displaying the details of that specific travel option. The summary table can appears in the top frame of a web browser.

BRIEF DESCRIPTION OF THE DRAWINGS

FIGS. 6 and 7 are diagrams of web pages depicting details of travel options provided in the web pages of FIGS. 3-5.

DESCRIPTION

Figure 1:
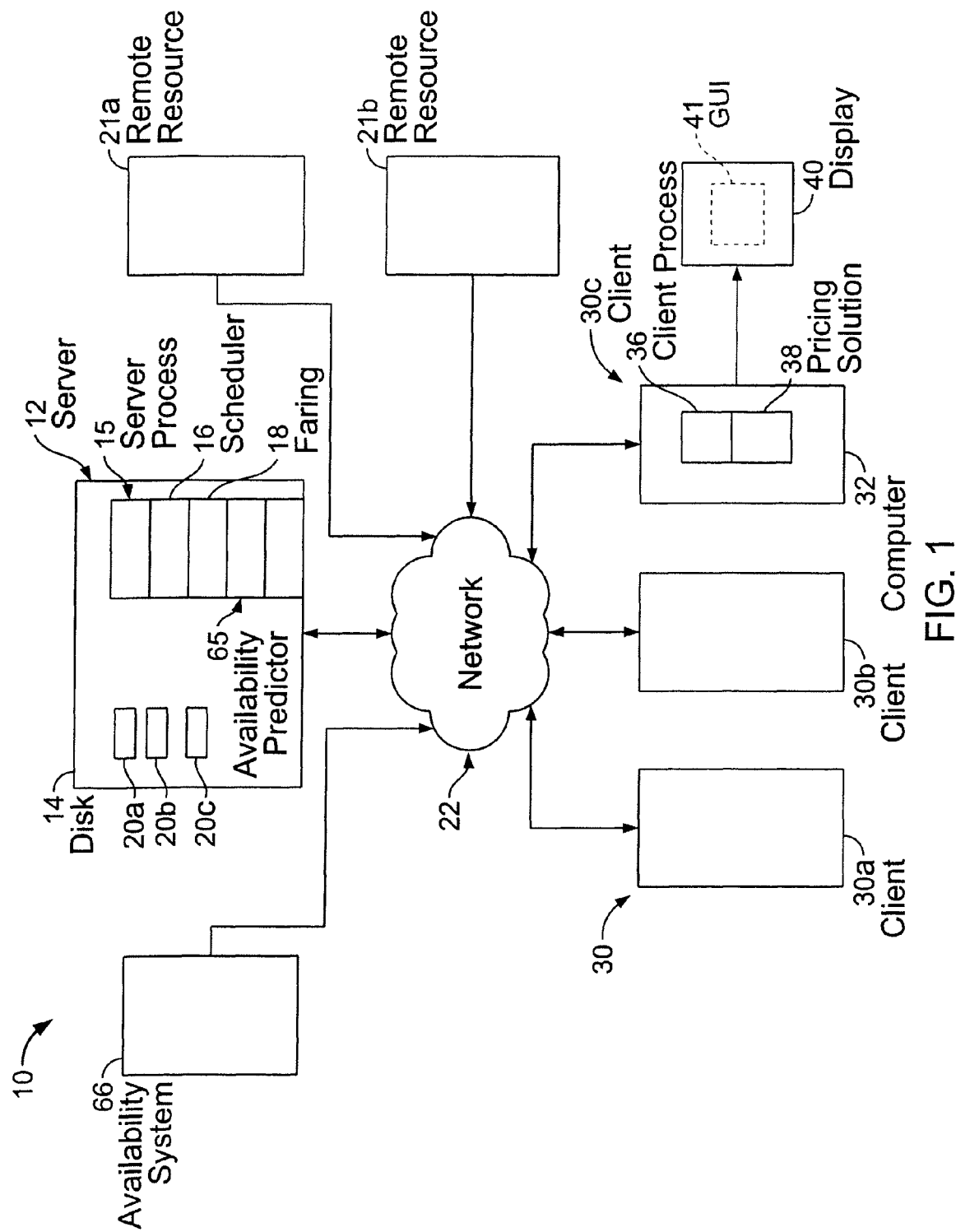
FIG. 1 is a block diagram of a client server travel planning system particularly operable over the Internet.

Referring to FIG. 1, a travel planning system 10 is shown. The travel planning system 10 can be used with various forms of travel such as airline, bus and railroad and is particularly adapted for air travel. Travel system 10 can include a server computer 12 having a computer memory or storage media 14 storing a server process 15. The server process 15 can include a scheduler process 16 and a faring process 18. An example of a scheduler process 16 is described in copending U.S. patent application Ser. No. 09/109,622, entitled "Scheduler System for Travel Planning Systems", filed on Jul. 2, 1998 by Carl G. de Marcken et al. and assigned to the assignee of the present invention and incorporated herein by reference. Also an example of a faring process 18 is described in copending U.S. patent application Ser. No. 09/109,873, entitled "Graphical User Interface for Travel Planning System", filed on Jul. 2, 1998 by Carl G. de Marcken et al and also assigned to the assignee of the present invention and incorporated herein by reference. As shown in FIG. 1, the system 10 can include databases 20a-20b that have access to remote resources 21a, 21b. The system 10 can also include a plurality of clients 30a-30c coupled to the server 12 via a network 22. Other travel planning systems such as those on the Internet can also be used.

The scheduler process 16 provides itineraries to a faring process 18. The faring process provides a set of pricing solutions by finding valid fares corresponding to the itineraries produced by the scheduler process 16. The faring process 18 also validates the fares for inclusion in a set of pricing solutions. The information to have the server produce the set of pricing solutions is obtain from a user entering data in a graphical user interface as will be described below. In addition, the set of pricing solutions are also displayed to the user through the graphical user interface.

Figure 2:
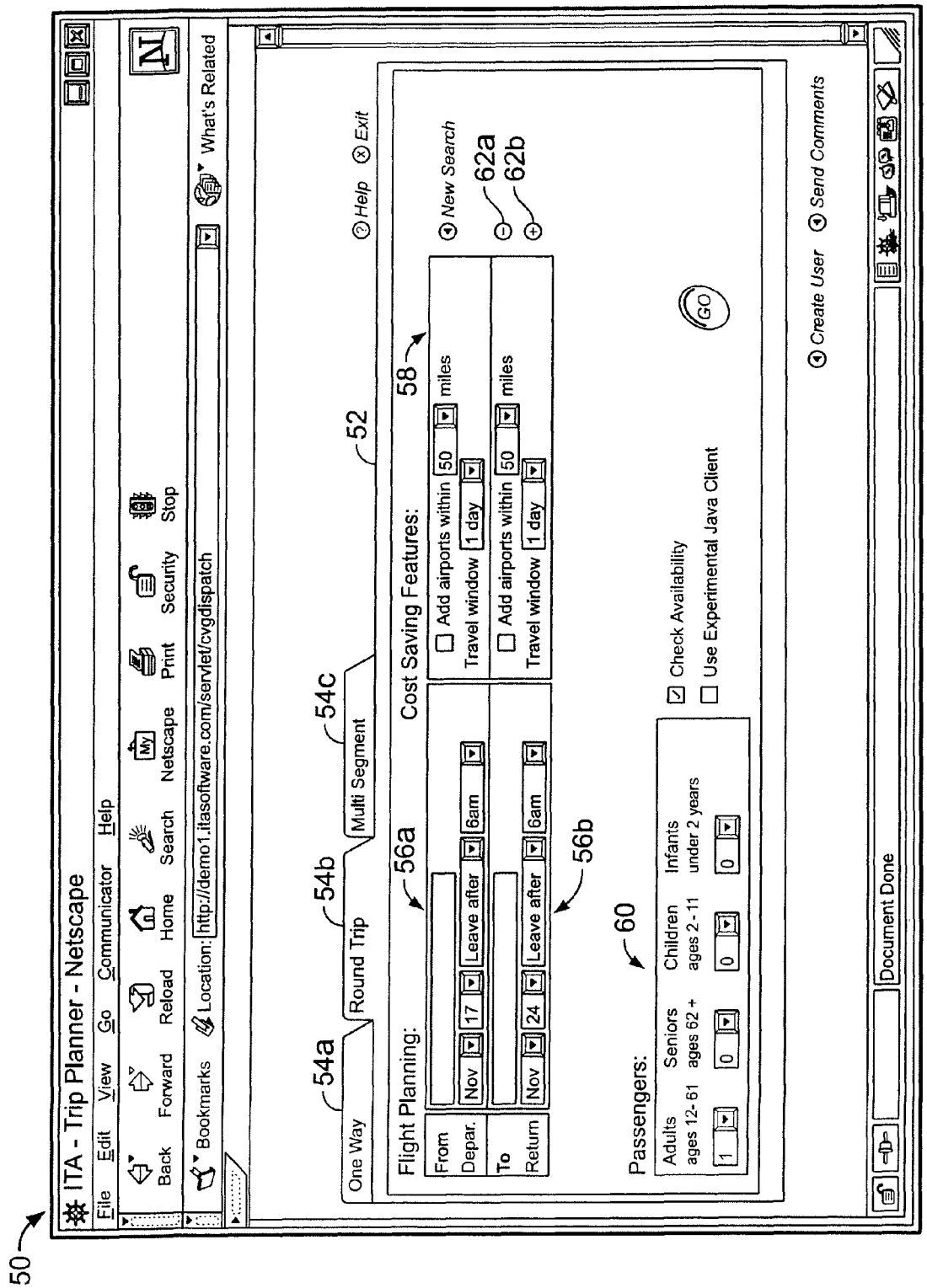
FIG. 2 is a diagram of a query screen for a graphical user interface implemented as a web page from a web browser.

Referring now to FIG. 2, a web page 50 that is part of a graphical user interface for the client process 36 is shown. The web page 50 allows the user to construct a query which can be executed by the server process 16 to produce flight plan options for the user.

The web page 50 includes a query table 52 which is a tab table 54 here comprised of three tabbed regions 54a-54c. The first tab is labeled one-way, the second tab round trip 54b and the third tab multi-segment 54c. The multi-segment tab is shown and is substantially the same as the other tabs except that the multi-segment tab allows the user to enter data for multiple segments of a flight by allowing the user to construct a new query segment region. For example, as shown in FIG. 2, the table includes a region 56a for entering flight information for a first segment of a flight. The information includes an origin to a destination and information concerning dates and time of travel. The query also allows the user to specify some potential cost saving feature by allowing the user to cause the server to look for other airports within 50 miles of a designated airport and include such other airports in answers for the segment. It also allows a user to specify a travel window. The table 54 also includes a second region 56b for entering similar information for a second segment and includes controls 62a and 62b for either removing a segment from the query or adding a segment to the query, thus allowing a user to provide a complex arrangement of segments corresponding to multi-segmented flights.

The web page 50 also allows for entry of passenger information such as the number of adults, seniors, children and infants which may be important in determining the fare price for a ticket. The web page 50 also allows a user to have the server process check seat availability on designated flights. With the check availability box activated, the server process 16 will return travel options for which there is seat availability.

Figure 3:
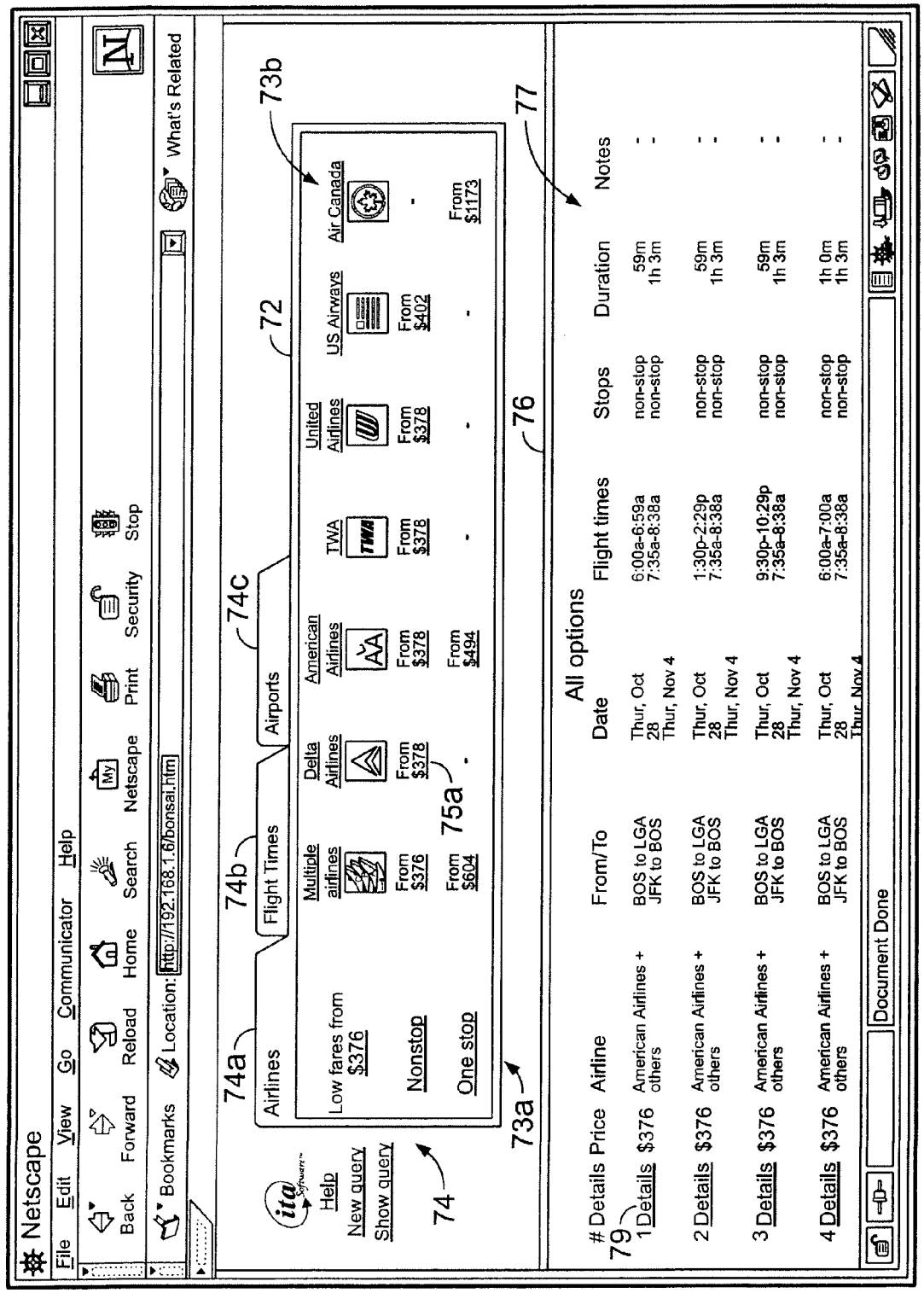
FIGS. 3-5 are diagrams of web pages depicting results of executing a query for a round trip based on information entered through the query screen of FIG. 2.

Referring now to FIG. 3, a web page 70 that depicts results from the server process 16 executing a query entered via the query page (FIG. 2) is shown. The web page 70, includes a table 72 that summarizes travel options. The travel option summary table 72 is a tab table comprised of a tab 74a that groups summary information by airlines, a tab 74b that groups summarized information by flight times and a tab 74c that summarizes travel information by airports.

Figure 4:
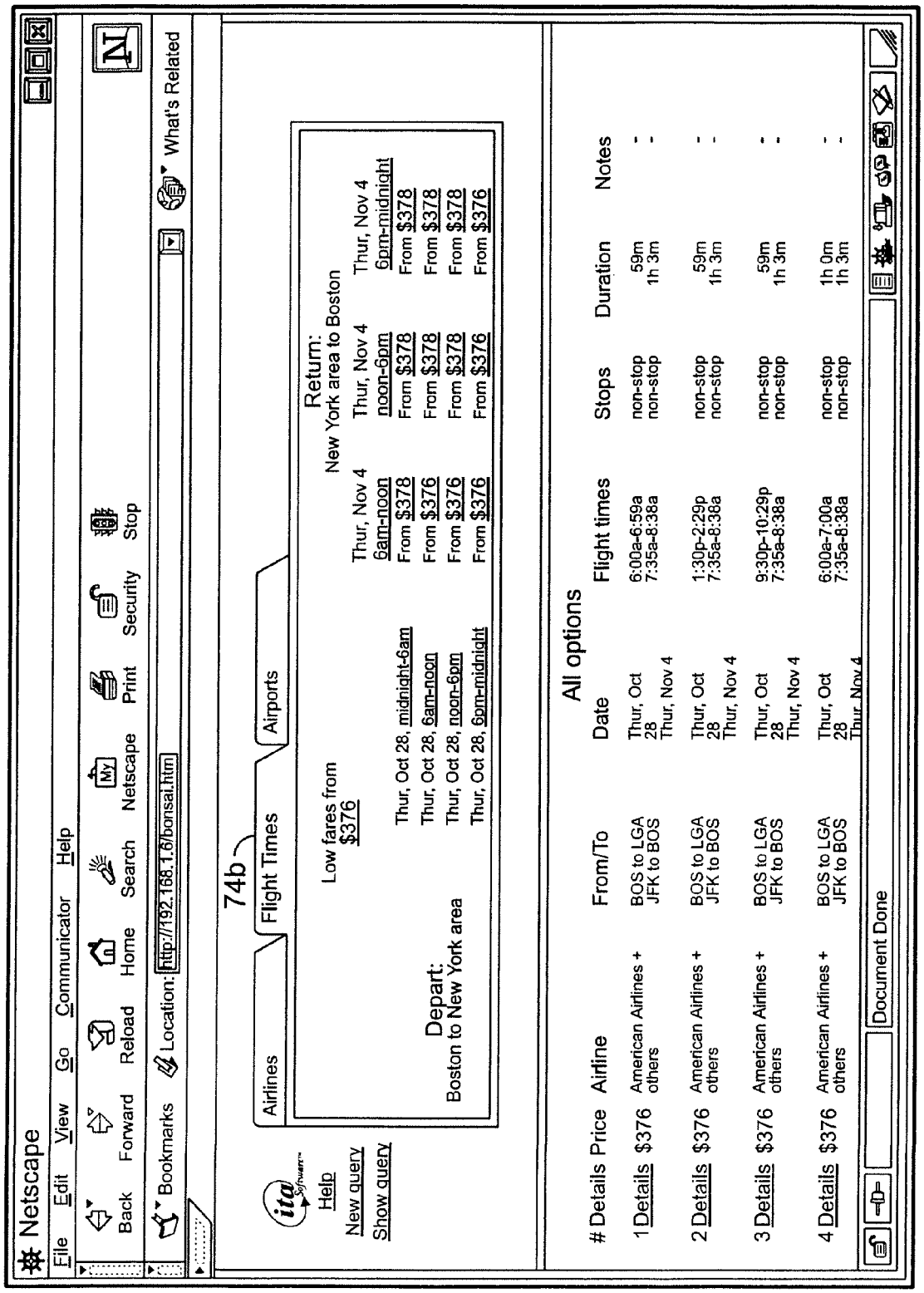
Figure 5:
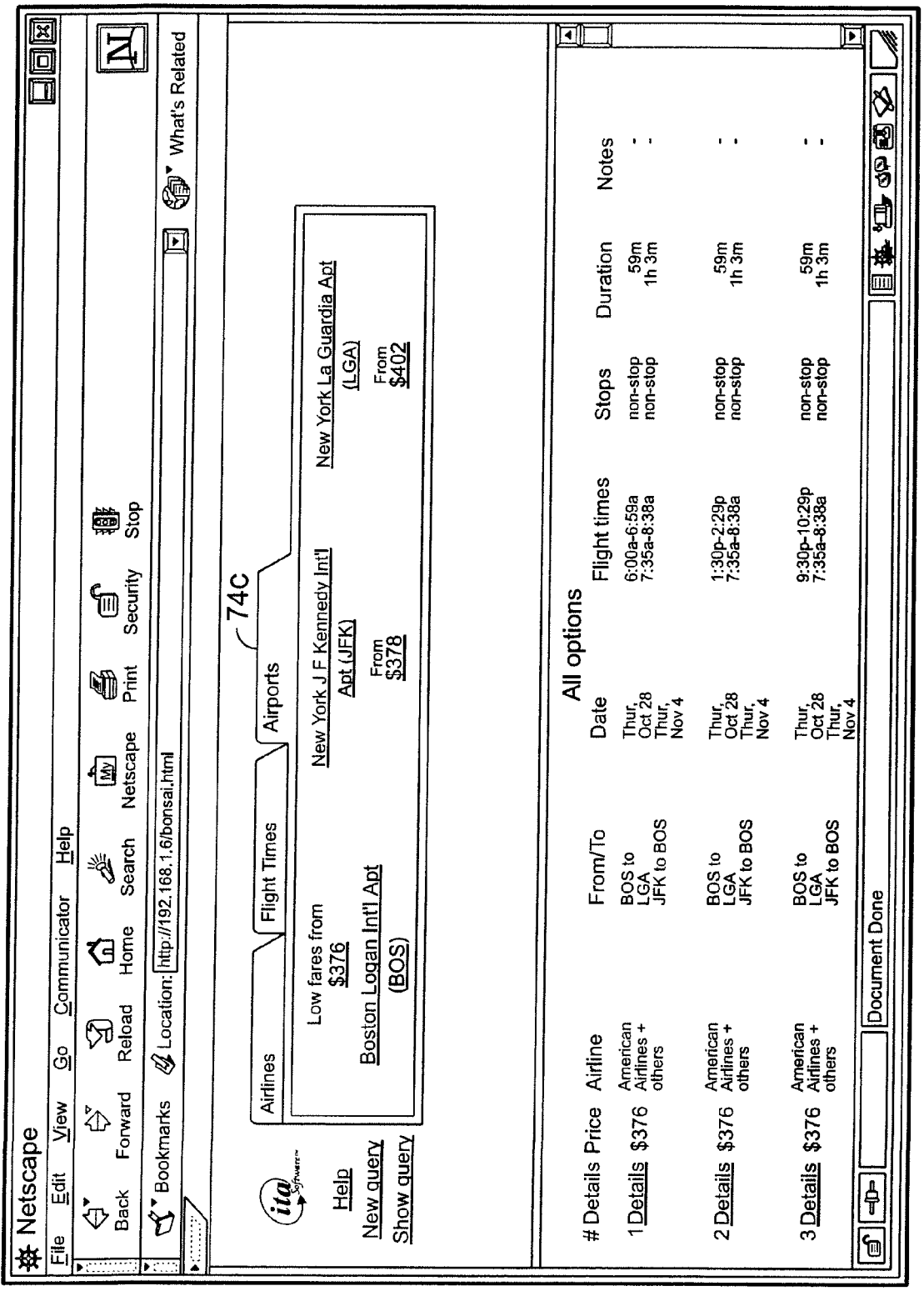

As shown in FIG. 3, with the airline tab 74a selected, the summary information in the table is arranged in rows and columns with each of the airlines arranged in columns of the table as links and each of the rows of the table 72 arranging specified travel options such as nonstop flights or one-stop flights, as links. Interior cells within the table 72 are links which correspond to prices for each of the airlines with respect to each of the travel options. The table displays a set of air travel options according to specified criteria, e.g., the airlines used in one or more of the travel options (displayed from left to right at the top of the table), and the number of stops or connections in the set of travel options. Here, the travel options represented by a given table cell are those options which use the airline in the same column as that cell, and that have the same number of stops as the "number of stops" header in the same row as that cell. A third criterion, price (i.e. price of an airline ticket), is displayed in each cell of the table; this price is the minimum price for any of the travel options that are represented by a given cell. Selecting a cell (by clicking on a URL in this case) displays, in the lower pane, a listing of the travel options for that particular cell. Each travel option contains a 'details' URL link in the row of information devoted to that travel option; clicking on that link takes the traveller to yet a third level of information, a detailed description of that travel option as shown in FIGS. 4 and 5. A general procedure to construct the graphical user interface is given below:
1) Obtain list of query-specific travel options.
2) For each criteria in travel options:
   Enumerate bins for the criteria
   For each travel option T:
      Place travel option T into some bin
3) Given the bins computed in (2), compute intersections of bins to determine what bins go in what cells of the summary table
4) Generate and display summary table given information from procedure (3).

If the travel system operates on a pricing graph, the links are hyperlinks to an enumeration algorithm such as described in the copending application which can sort through a pricing graph, as described in the above application, and return a set of travel options which correspond to the intersection of here the airline represented in the column and the travel option represented in the selected row. Otherwise the links activate routines to sort through a list of travel options.

Figure 7:
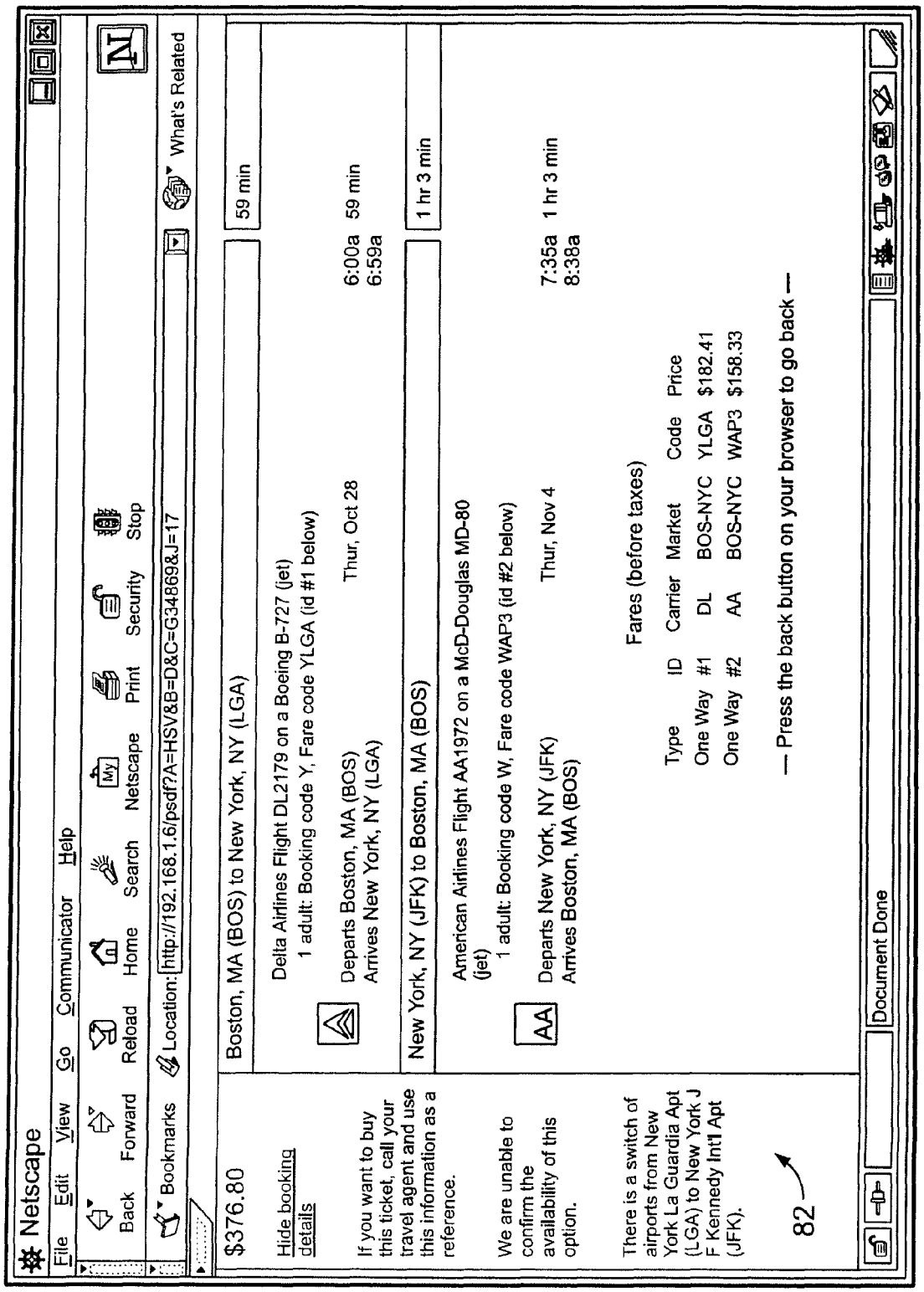

Thus, for example, selecting Delta Airlines and non-stop flights corresponding to cell 75a which has value of $378 will bring up all non-stop options on Delta Airlines, e.g., no stops in any segment and depict the top 30 of those results in the results frame 76. Thus, the links in the table 72 are used to control the display of travel options in the results frame 76. The results frame 76 includes a plurality of results, here the top 30 results are typically shown, arranged in a table with a hyperlink denoted as "details" which, when activated, brings up details of the travel option such as shown in FIG. 6. FIG. 6 also has a second link which, when activated, brings up booking details as shown in FIG. 7. FIGS. 6 and 7 in addition to showing details of the travel option also shows warnings 80 and planning suggestions 82.

Returning to FIG. 3, the table 72 allows the display of summary information in different manners depending on which tab is selected.

As shown in FIG. 4, when the flight time tab 74b is selected, the table 72 is arranged to show departure times between the origin and the destination over ranges of times for the potential days of travel in the outbound portion of the trip in rows of the table, as well as departure time for the return portion of the trip in columns of the table 72 over time ranges in the potential return days. Thus, selecting one of the outer peripheral cells of the table will bring up all flight options on a designated day in the designated time area; whereas selecting an interior cell will produce the intersection of options for a time segment on the selected outbound date and the time segment of the selected return date. The table 72 also depicts the starting or lowest fares for each one of the different time segments allowing a user to decide the most appropriate time to travel giving considerations such as cost and convenience.

As shown in FIG. 5, when the airport tab 74c is selected, the summary table has columns corresponding to destination airports and rows corresponding to origin airports.

The summary table 72 segments or compartmentalizes travel options into bins, according to criteria that the user might use to select a specific travel option. Each dimension of the table has a travel criterion associated with it (for example, a two-dimensional table would have a criterion along the horizontal rows of the table, and a criterion along the vertical columns of the table). In addition, another, different criterion is represented in the cells of the table. The process for producing a summary table, given a set of travel options and a set of criteria, is given below. For example, other criteria could be used within the interior cells or at the edges of the table.

The graphical user interface is populated by obtaining a list of query-specific travel options. For each criteria the process will enumerate bins for this criteria, and for each travel option T, the process places the travel option T into some bin. Given the bins computed the process computes intersections of bins to determine what bins go in what cells of the summary table. The process generates and displays the summary table with the determined information.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:
1. A computer program product tangibly embodied on a computer readable device, the computer program product for rendering a graphical user interface for travel planning, the computer program product comprising instructions for causing a computer to:
   generate a tabbed table reflecting a set of travel options comprising a plurality of tabs, each tab including a tabular region comprised of a plurality of cells arranged in plural rows and plural columns, each tab representing a different grouping of travel options according to a first criterion, with the plural rows of each tab representing different values of the first criterion, and the plural columns of each tab corresponding to a second, different criterion of the set of travel options;
   populate the cells of the table with controls comprising links to routines that, when a control is selected, retrieve groups of travel options from the set of travel options grouped according to the criterion of a selected tab and a value of the first criterion according to a selected row of the selected tab and a value of the second, different criterion of a selected column of the selected tab;

cause the results to be displayed as a grouping of travel options, upon activation of one of the controls associated with an interior one of the cells in the rows and columns, in accordance with criteria corresponding to an intersection of a corresponding row and a corresponding column.

2. The computer program product of claim 1 further comprising instructions for causing a computer to:

configure the tabs of the tabbed table to render an airport tab, an airline tab and a flight times tab.

3. The computer program product of claim 1 further comprising instructions for causing a computer to:

group travel options according to airlines;
group travel options according to airports; and
group travel options according to flight times.

4. The computer program product of claim 1 further comprising instructions for causing a computer to:

populate the tabs of the tabbed table with the controls, a first portion of the controls to render groups of travel options according to airlines, a second portion of the controls to render groups of travel options according to airports and a third portion of the controls to render groups of travel options according to flight times.

5. A display device rendering a graphical user interface, the graphical user interface summarizing travel options and comprising:

a tabular region, and a plurality of cells that are arranged in plural columns and plural rows, with the cells displaying a summary of a criterion of a set of travel options, and with the cells comprising controls that when selected, provide information regarding a subset of the travel options that correspond to the criterion or criteria of the cell associated with the selected control;

wherein interior cells that intersect at least one column and at least one row have a value that summarizes travel options that meet a pair of criteria according to the criterion in a respective one of the columns and the criterion in a respective one of the rows; and further wherein upon actuation of one of the controls that is an interior one of the cells in the rows and columns, causes results to be displayed as a grouping of travel options in accordance with criteria corresponding to the intersection of a corresponding row and a corresponding column.

6. The display device rendering a graphical user interface of claim 5 further comprising:

a second region that displays data for each of the travel options in the subset of the travel options that correspond to the criterion or criteria of the cell associated with the selected control.

7. The display device rendering a graphical user interface of claim 5 wherein the controls are hyperlinks.

8. The display device rendering a graphical user interface of claim 5 wherein actuation of one of the controls in one of the rows or columns on the periphery of the tabular regions causes results to be displayed as a grouping of travel options in accordance with a summary of a criterion corresponding to the selected peripheral one of the rows or columns.

9. The display device rendering a graphical user interface of claim 5 wherein the controls are links to routines that invoke an appropriate filter.

10. The display device rendering a graphical user interface of claim 5 wherein the tabular region is a tabbed table comprising at least one of an airline tab, an airport tab, or a flight time tab.

11. The display device rendering a graphical user interface of claim 5 wherein the graphical user interface is represented in a first web page and a results region displays itineraries and includes links that invoke a second web page to display details of the itineraries.

12. A computer program product tangibly embodied on a computer readable device, the computer program product for rendering a graphical user interface for travel planning, the computer program product comprising instructions for causing a computer to:

generate a tabular region reflecting a set of travel options comprised of a plurality of cells arranged in plural rows and plural columns with the plural rows representing a first criterion of the travel options and the plural rows corresponding to a second, different criterion of the travel options;

populate the cells of the tabular region with controls comprising links to routines that retrieve travel options according to the criterion of the plural rows and the criterion of the plural columns; and cause results to be displayed as a grouping of travel options, upon actuation of one of the links to routines associated with an interior one of the cells in the rows and columns, in accordance with criteria corresponding to an intersection of a corresponding row and a corresponding column.

13. The computer program product of claim 12 wherein the cells in the tabular region are arranged in a column, and actuation of one of the controls causes results to be displayed as a grouping of travel options according to a criterion of the set of travel options, with the criterion corresponding to the actuated control.

14. The computer program product of claim 12 further comprising instructions to:

cause the results to be displayed in the graphical user interface upon actuation of one of the controls in a peripheral one of the rows or columns, as a grouping of travel options in accordance with the criterion corresponding to the peripheral one of the rows or columns associated with the acutuated control.

15. The computer program product of claim 12, further comprising instructions to:

execute one of the routines upon actuation of the control to produce the results.

16. The computer program product of claim 12 wherein the tabular region is a tabbed table comprising at least one of an airline tab, an airport tab, or a flight time tab.

17. The computer program product of claim 16 wherein the tabbed table has an airline tab, and the computer program product further comprises instructions to:

render on a display the tabbed table with columns corresponding to airlines and rows corresponding to number of stops.

18. The computer program product of claim 16 wherein the tabbed table has a flight times tab, and the computer program product further comprises instructions to:

render on a display the tabbed table with rows corresponding to departure times for a first one of a pair of slices of a trip and with the columns corresponding to departure times for the second one of the pair of slices of the trip.

19. The computer program product of claim 18 wherein the departure times are a range of departure times.

20. The computer program product of claim 16 wherein the tabbed table has an airports tab, and the computer program product further comprises instructions to:
- render on a display the tabbed table with rows corresponding to one or more potential origin airports for a trip and with the columns corresponding to one or more potential destination airports of the trip.

21. A computer system, comprising:
a computer;
a computer readable medium storing a computer program product tangibly embodied on a computer readable device, the computer program product for rendering a graphical user interface, the computer program product comprising instructions for causing a computer to:
- generate a tabular region comprised of a plurality of cells arranged in plural rows and plural columns with the plural rows representing a first criterion of items and the plural rows corresponding to a second, different criterion of the items; and
- populate the cells of the table with links to routines that retrieve items according to the criterion of the plural rows and the criterion of the plural columns; and
wherein the computer program product further comprises instructions for rendering the graphical user interface with interior cells that intersect at least one column and at least one row displaying a value that summarizes items that meet a pair of criteria of the items, according to the criterion in a respective one of the columns and the criterion in a respective one of the rows.

22. The computer system of claim 21 wherein the computer program product further comprises instructions for causing a computer to render the graphical user interface with the cells in the tabular region arranged in a column, and whereupon actuation of one of the links to routines corresponding to a selected cell in the column causes items to be displayed as a grouping of items in accordance with the criterion corresponding to the selected cell.

23. The computer system of claim 21 wherein the computer program product further comprises instructions for causing a computer to render the graphical user interface with the cells in the tabular region arranged in rows and columns, and upon actuation of one of the links to routines corresponding to a selected cell in a peripheral one of the rows or columns, causes items to be displayed as a grouping of items in accordance with the criterion corresponding to the peripheral one of the rows or columns associated with the selected cell.

24. The computer system of claim 21 wherein the computer program product further comprises instructions for causing a computer to render the graphical user interface with the cells in the tabular region arranged in rows and columns, and upon actuation of one of the links to routines corresponding to a selected cell that is an interior one of the cells in the rows and columns, causes items to be displayed as a grouping of items in accordance with a intersection of a pair of criteria corresponding to the intersection of the row and column of the selected cell.

25. The computer system of claim 21 wherein the computer program product further comprises instructions for causing a computer to render the graphical user interface, and executes routines to filter the set of travel options according to the selected criteria.

26. The computer system of claim 21 wherein the computer program product further comprises instructions for causing a computer to render the graphical user interface as a web page in a web browser and the links to routines are hyperlinks that cause code to be executed that is associated with algorithms.

27. The computer system of claim 21 wherein the computer program product further comprises instructions for causing a computer to render the tabular region having the cells as a tabbed table comprising a plurality of tabs, with each tab corresponding to a different criterion of the items.

28. A computer system, comprising:
a computer;
a computer readable medium storing a computer program product tangibly embodied on a computer readable device, the computer program product for rendering a graphical user interface, the computer program product comprising instructions for causing a computer to:
- generate a tabular region comprised of a plurality of cells arranged in plural rows and plural columns with the plural rows representing a first criterion of items and the plural rows corresponding to a second, different criterion of the items; and
- populate the cells of the tabular region with links to routines that retrieve items according to the criterion of the plural rows and the criterion of the plural columns; and
wherein the computer program product renders the graphical user interface with controls in the tabular region arranged in rows and columns, and upon actuation of one of the controls that is an interior one of the cells in the rows and columns, causes items to be displayed as a grouping of items in accordance with an intersection of a pair of criteria corresponding to the intersection of the row and column associated with the actuated control.

29. The computer system of claim 28 wherein the controls are links to routines that invoke an appropriate filter.

30. The computer system of claim 21 wherein the tabular region is a tabbed table comprising at least one of an airline tab, an airport tab, or a flight times tab.

31. The computer system of claim 28 wherein the tabular region is a tabbed table comprising at least one of an airline tab, an airport tab, or a flight times tab.

32. The computer system of claim 31 wherein the tabbed table has an airline tab, and the computer program product further comprises instructions to:
- render on a display the tabbed table with columns corresponding to airlines and rows corresponding to number of stops.

33. The computer system of claim 31 wherein the tabbed table has a flight times tab, and the computer program product further comprises instructions to:
- render on a display the tabbed table with rows corresponding to departure times for a first one of a pair of slices of a trip and with the columns corresponding to departure times for the second one of the pair of slices of the trip.

34. The computer system of claim 33 wherein the computer program product further comprises instructions to render a range of departure times.

35. The computer system of claim 31 wherein the tabbed table has an airports tab, and the computer program product further comprises instructions to:
- render on a display the tabbed table with rows corresponding to one or more potential origin airports for a trip and with the columns corresponding to one or more potential destination airports of the trip.

36. A computer system, comprising:
a computer;
a computer readable medium storing a computer program product tangibly embodied on a computer readable device, the computer program product for rendering a graphical user interface, the computer program product comprising instructions for causing a computer to:

generate a tabular region comprised of a plurality of cells arranged in plural rows and plural columns with the plural rows representing a first criterion of a set of travel options, and the plural rows corresponding to a second, different criterion of the set of travel options;

populate the cells of the tabular region with controls comprising links to routines that retrieve travel options from the set of travel options according to the criterion of the plural rows and the criterion of the plural columns; and wherein the computer program product renders the graphical user interface with interior cells that intersect at least one column and at least one row displaying a value that summarizes the travel options according to the criterion in a respective one of the columns and the criterion in a respective one of the rows.

37. The computer system of claim 36 wherein the computer program product further comprises instructions for causing a computer to render the graphical user interface with the controls in the tabular region arranged in a column, and where upon actuation of one of the controls in the column causes items to be displayed as a grouping of travel options in accordance with the criterion corresponding to the control.

38. The computer system of claim 36 wherein the computer program product further comprises instructions for causing a computer to render the graphical user interface with the controls in the tabular region arranged in rows and columns, and upon actuation of one of the controls in a peripheral one of the rows or columns, causes travel options to be displayed as a grouping of travel options in accordance with the criterion corresponding to the peripheral one of the rows or columns associated with the cell associated with the actuated control.

39. The computer system of claim 36 wherein the computer program product further comprises instructions for causing a computer to render the graphical user interface and executes the routines to filter the set of travel options according to the selected criteria.

40. The computer system of claim 36 wherein the computer program product further comprises instructions for causing a computer to render the graphical user interface as a web page in a web browser and the controls are hyperlinks that cause code to be executed that is associated with algorithms.

41. The computer system of claim 36 wherein the computer program product further comprises instructions for causing a computer to render the tabular region having the controls as a tabbed table comprising a plurality of tabs, with each tab corresponding to a different criterion of the travel options.

42. The computer system of claim 41 wherein the computer program product causes to be rendered a tabbed table having an airline tab and the computer program product further comprises instructions to:

render on a display the tabbed table with columns corresponding to airlines and rows corresponding to number of stops.

43. The computer system of claim 41 wherein the tabbed table has an airports tab and the computer program product further comprises instructions to:

render on a display the tabbed table with rows corresponding to one or more potential origin airports for a trip and with the columns corresponding to one or more potential destination airports of the trip.

44. The computer system of claim 36 wherein the tabular region has a flight times tab and the computer program product further comprises instructions to:

render on a display the tabular region with rows corresponding to departure times for a first one of a pair of slices of a trip and with the columns corresponding to departure times for the second one of the pair of slices of the trip.

45. The computer system of claim 44 wherein the computer program product causes the departure times to be rendered as a range of departure times.

46. A computer system, comprising:
a computer;
a computer readable medium storing a computer program product tangibly embodied on a computer readable device, the computer program product for rendering a graphical user interface, the computer program product comprising instructions for causing a computer to:

generate a tabular region comprised of a plurality of cells arranged in plural rows and plural columns with the plural rows representing a first criterion of a set of travel options, and the plural rows corresponding to a second, different criterion of the set of travel options;

populate the cells of the tabular region with controls comprising links to routines that retrieve travel options from the set of travel options according to the criterion of the plural rows and the criterion of the plural columns; and wherein the computer program product renders the graphical user interface with controls in the tabular region arranged in rows and columns, and upon actuation of one of the controls that is an interior one of the cells in the rows and columns, causes travel options to be displayed as a grouping of travel options in accordance with an intersection of a pair of criteria corresponding to the intersection of the row and column associated with the actuated control.

47. The computer system of claim 46 wherein the controls are links to routines that invoke an appropriate filter.

48. The computer system of claim 36 wherein the tabular region is a tabbed table comprising at least one of an airline tab, an airport tab, or a flight times tab.

49. The computer system of claim 46 wherein the tabular region is a tabbed table comprising at least one of an airline tab, an airport tab, or a flight times tab.

50. The computer system of claim 49 wherein the tabbed table has an airline tab, and the computer program product further comprises instructions to:

render on a display the tabbed table with columns corresponding to airlines and rows corresponding to number of stops.

51. The computer system of claim 49 wherein the tabbed table has a flight times tab, and the computer program product further comprises instructions to:

render on a display the tabbed table with rows corresponding to a departure times for a first one of a pair of slices of a trip and with the columns corresponding to departure times for the second one of the pair of slices of the trip.

52. The computer system of claim 51 wherein the departure times are a range of departure times.

53. The computer system of claim 49 wherein the tabbed table has an airports tab, and the computer program product further comprises instructions to:

render on a display the tabbed table with rows corresponding to one or more potential origin airports for a trip and with the columns corresponding to one or more potential destination airports of the trip.

* * * * *

UNITED STATES PATENT AND TRADEMARK OFFICE
CERTIFICATE OF CORRECTION

| | | |
|---|---|---|
| PATENT NO. | : 8,266,547 B2 | Page 1 of 1 |
| APPLICATION NO. | : 12/185154 | |
| DATED | : September 11, 2012 | |
| INVENTOR(S) | : Rodney S. Daughtrey | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 603 days.

Signed and Sealed this
First Day of January, 2013

David J. Kappos
*Director of the United States Patent and Trademark Office*